UNITED STATES PATENT OFFICE.

ROBERT WAHL AND MAX HENIUS, OF CHICAGO, ILLINOIS.

PROCESS OF MAKING YEAST FOOD.

SPECIFICATION forming part of Letters Patent No. 540,471, dated June 4, 1895.

Application filed February 18, 1895. Serial No. 538,871. (No specimens.)

*To all whom it may concern:*

Be it known that we, ROBERT WAHL and MAX HENIUS, citizens of the United States, residing at Chicago, in the county of Cook and State of Illinois, have invented a new and useful Improvement in Yeast Food and Process of Preparing the Same, of which the following is a specification.

The object of our invention is to provide, as an article of manufacture, the same food as that upon which yeast nourishes itself; and as the primary incentive to our invention arose from the relation yeast bears as the fermentation-producing agent in the manufacture of alcoholic beverages, we confine the description hereinafter contained, in the main, to its purpose in that connection.

The microscopically small plant known as yeast grows in liquids in which it produces and carries on fermentation, feeding on a number of substances contained in the liquids, namely, nitrogenous substances (as peptones and amides) and mineral substances (mainly phosphates and potash salts). Without proper nourishment the yeast is unable to effect the conversion of the sugar into alcohol and carbonic acid gas, or, in other words, to accomplish its purpose in the production of alcoholic beverages. When the liquor (the wort of the brewer, and the mash of the distiller) is produced from malt, the yeast finds therein a sufficient quantity of its peptone and phosphate food, and therefore rapidly ferments the sugar; and after the fermentation, it settles quickly in the vessel in which the fermentation was carried on, forming a sediment in the bottom of the vessel. After drawing off the liquor the yeast may be taken out and used over again to incite and carry on fermentation anew.

It is common, particularly in the United States, in the manufacture of beer and alcoholic spirits, to substitute for malt, unmalted cereals, which contain but very little peptones and less phosphates than malt. Hence the yeast, failing to find proper and sufficient nourishment in the liquor, gradually degenerates, the fermentation becomes sluggish, and, since the cell-aggregations become smaller as a consequence, they will not settle properly. To counteract these results nursing of the yeast, as it were, is resorted to, to uphold its strength sufficiently to enable it to accomplish its purpose, by adding to the yeast the yeast-nourishing substances it lacks. The substances thus commonly added in breweries and distilleries, are phosphates and peptones, potash and ammonia salts; and the addition is usually made to the yeast previous to introducing it into the liquor to be fermented. The yeast is also commonly aerated and otherwise protected in various ways against adverse influences; and it is frequently found necessary to add a preservative agent to the yeast, like salicylic acid, to keep within bounds the growth of bacteria, which thrive much better in a liquor wherein fermentation is produced by a weak yeast than in one wherein a strong yeast is used.

We aim, by our improvement, to provide a more effective and less costly strengthening medium for yeast than has heretofore been used for the purpose, by extracting from yeast, the yeast-nourishing substances it contains. The yeast we use occurs in superfluous quantities in breweries and distilleries and in the manufacture of wine, and has taken up from the liquor in which it was used, and holds, quantities of peptones, amides, ammonia salts, phosphate of potash and other mineral substances to nourish and build up its progeny. We may thus use for our purpose any yeast, upper or lower, which is not required for purposes of further fermentation.

Our invention consists in the yeast-food extracted from this waste-yeast product and in the process we have devised for procuring the extract.

To practice our improved process, we heat preferably to the degree of boiling the yeast, carrying the peptones and phosphates and other food-material it has taken up, for, say, thirty minutes or thereabout, whereby the yeast-cells are destroyed and their membranes broken, freeing their contents to permit them to become dissolved in the water of which a sufficient quantity to take up the freed soluble nitrogenous compounds and mineral substances is normally mixed with the yeast. We prefer, however, to add to this normal mixture, previous to boiling, more—say an equal quantity of—water, to insure a more complete extraction and separation of the yeast-food. The liquid portion of the resultant decoction is thereupon, preferably, separated from the particles in suspension therein, and the separation may be produced by precipitation, decanting or filtration. The resultant solution may be used in that form, and after cooling it, by adding it to yeast to be used for producing fermentation. We prefer, however, to afford to it better keeping quality and render it more marketable, to condense the liquid yeast-food, which is preferably done by evaporation *in vacuo*, and thereby reduce it to the consistency of sirup. This sirup-like product, which is the most desirable form of our improved article of yeast-food, may best be mixed with yeast, to nourish it while carrying on fermentation, immediately before or after the yeast is introduced into the liquor to be fermented, in the same way that the usually employed yeast-strengthening mediums are commonly added, as aforesaid.

Our yeast-food product, since it contains a large proportion of easily digestible peptones and phosphates, affords a very desirable tonic for the human system; and we desire to be understood as intending it also for such use. Its qualities and stimulating action on the human system may be compared with those of beef-extract, it being useful for culinary as well as medicinal purposes; and the very high percentage of phosphates it contains, and especially of phosphate of potash, renders it a peculiarly effective tonic.

As yeast contains much hop-resin, which would give to the tonic a bitter taste if allowed to remain therein, when the yeast-food is prepared for use as a tonic the first step should be, if this bitter taste be not desired, to extract from the yeast this resin, which may be done by adding to it a solution of caustic soda, or carbonate of soda, or of ammonia, or any suitable alkali, in quantity sufficient to dissolve the hop-resin. The yeast is then allowed to settle, and the supernatant liquid containing the hop-resin is run off, after which the yeast may be washed, if desired, preparatory to boiling or heating it and thereafter treating it in the manner already described.

What we claim as new, and desire to secure by Letters Patent, is—

1. As a new article of manufacture, yeast-food comprising an extract from yeast containing its soluble nitrogenous compounds and mineral substances, substantially as described.

2. As a new article of manufacture, yeast-food comprising a condensed extract from yeast containing its nitrogenous compounds and mineral substances, substantially as described.

3. The process of preparing yeast-food, which consists in heating the yeast carrying the yeast-food to destroy the yeast and free the contents of its membranes, thereby subjecting said contents to dissolution in the liquid, substantially as described.

4. The process of preparing yeast-food, which consists in heating yeast carrying the yeast-food, to destroy the yeast and free the contents of its membranes, thereby subjecting said contents to dissolution in the liquid, and thereupon separating the solution from the particles in suspension therein, substantially as described.

5. The process of preparing yeast-food, which consists in mixing yeast, carrying the yeast-food, with water, heating the mixture to destroy the yeast and free the contents of its membranes, thereby subjecting said contents to dissolution in the liquid, and thereupon separating the solution from the particles in suspension therein, substantially as described.

6. The process of preparing yeast-food, which consists in heating yeast carrying the yeast-food to destroy the yeast and free the contents of its membranes, thereby subjecting said contents to dissolution in the liquid, thereupon separating the solution from the particles in suspension therein, and finally condensing the solution, substantially as described.

7. The process of preparing yeast-food, which consists in heating yeast carrying the yeast-food to destroy the yeast and free the contents of its membranes, thereby subjecting said contents to dissolution in the liquid, thereupon separating the solution from the particles in suspension therein, and finally condensing the solution by subjecting it to evaporation *in vacuo*, substantially as described.

8. The process of manufacturing a yeast-food tonic, which consists in dissolving out of yeast carrying the yeast-food, the hop-resin, then heating the residue to destroy the yeast and free the contents of its membranes, thereby subjecting said contents to dissolution in the water, thereupon separating the solution from the particles in suspension therein, and finally condensing the solution, substantially as described.

ROBERT WAHL.
MAX HENIUS.

In presence of—
M. J. FROST,
J. N. HANSON.